(12) United States Patent
Liu et al.

(10) Patent No.: US 8,595,404 B2
(45) Date of Patent: Nov. 26, 2013

(54) METHOD AND APPARATUS FOR DEVICE DYNAMIC ADDITION PROCESSING, AND METHOD AND APPARATUS FOR DEVICE DYNAMIC REMOVAL PROCESSING

(71) Applicant: Huawei Technologies Co., Ltd., Guangdong (CN)

(72) Inventors: Jiang Liu, Beijing (CN); Hanjun Guo, Hangzhou (CN); Wei Wang, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/687,811

(22) Filed: Nov. 28, 2012

(65) Prior Publication Data
US 2013/0091313 A1    Apr. 11, 2013

Related U.S. Application Data

(63) Continuation of application No. PCT/CN2011/077931, filed on Aug. 2, 2011.

(51) Int. Cl.
*H05K 7/10* (2006.01)
(52) U.S. Cl.
USPC .................................. 710/302; 707/999.1
(58) Field of Classification Search
USPC ................. 710/301–302; 707/999.1–999.102
See application file for complete search history.

(56) References Cited

U.S. PATENT DOCUMENTS 6,148,355 A    11/2000 Mahalingam
6,681,282 B1    1/2004 Golden et al.
2004/0122973 A1    6/2004 Keck et al.
2007/0124324 A1*    5/2007 Adi et al. ..................... 707/102
2008/0184024 A1    7/2008 Nicklaus et al.

FOREIGN PATENT DOCUMENTS

CN    1729662 A    2/2006
CN    101827069 A    9/2010

OTHER PUBLICATIONS

Chinese Search Report in corresponding Chinese Patent Application No. 201180001568.X (Jan. 22, 2013).
Written Opinion of the International Searching Authority in corresponding PCT Patent Application No. PCT/CN2011/077931 (Apr. 5, 2012).
International Search Report in corresponding PCT Patent Application No. PCT/CN2011/077931 (Apr. 5, 2012).
1st Office Action in corresponding Chinese Patent Application No. 201180001568.X (Jan. 31, 2013).

* cited by examiner

*Primary Examiner* — Clifford Knoll
(74) *Attorney, Agent, or Firm* — Leydig, Voit & Mayer, Ltd.

(57) ABSTRACT

A method and an apparatus for device dynamic addition processing, and a method and an apparatus for device dynamic removal processing. A dynamic addition dependency relationship list may be obtained from a BIOS, and dynamic addition processing is performed on a certain device to be dynamically added, according to the dynamic addition dependency relationship list; a user is prompted to dynamically add the target device, and when there is a certain device to be dynamically removed, a dynamic removal dependency relationship list and a dynamic addition dependency relationship list of a corresponding device may be obtained from the BIOS as needed, and dynamic removal analysis and processing are performed according to the combination of the dynamic removal dependency relationship list and dynamic addition dependency relationship list of the corresponding device, so as to prompt the user to dynamically remove the target device.

15 Claims, 7 Drawing Sheets

METHOD AND APPARATUS FOR DEVICE DYNAMIC ADDITION PROCESSING, AND METHOD AND APPARATUS FOR DEVICE DYNAMIC REMOVAL PROCESSING

CROSS-REFERENCE TO RELATED APPLICATIONS

This application is a continuation of International Patent Application No. PCT/CN2011/077931, filed on Aug. 2, 2011, which is hereby incorporated by reference in its entirety.

FIELD OF THE INVENTION

The present invention relates to the field of device hot-plugging technologies, and in particular, to a method and an apparatus for device dynamic addition processing, and a method and an apparatus for device dynamic removal processing.

BACKGROUND OF THE INVENTION

In the field of middle and high-end servers, a server is generally formed of multiple computing nodes and IO (Input/Output, output/input) frames, and a computing node is formed of devices such as a CPU, a memory and an IO. In order to implement dynamic capacity expansion, error processing, energy conservation and power saving, a system administrator or an operation system may need to perform hot-plugging on a device in a server. That is, under the premise that a server does not stop running, computing nodes, IO frames, and a CPU and a memory in a node are dynamically added (devices are put online) and dynamically removed (devices are put offline), so as to achieve objectives such as capacity expansion and error correction, and improve server reliability or service processing capability.

In order to implement device hot-plugging, a hardware platform, a BIOS (Basic Input Output System) and an OS (Operation System) need to tightly cooperate. The hardware platform is responsible for device power-on/power-off control; the BIOS is responsible for processing and screening all details related to the hardware platform, so as to provide a universal and platform-unrelated operation environment for the OS; the OS configures and uses a corresponding device in a platform-unrelated manner by using an interface provided by the BIOS. By providing a platform-unrelated interface between the BIOS and the OS, flexibility and universality of the OS may be improved, thereby reducing development and maintenance work when a new platform is supported.

For hot-plugging of each device of a server, a very important aspect is to solve a dependency relationship between devices in the server. Because of constraint of a system architecture and hardware components of the server, an interdependency relationship may exist between the devices. For example, a currently common 4-way server of Xeon and IA64 generally adopts a topology structure as shown in FIG. 1. In this topology structure, a dependency relationship exists between devices of the server as follows:

A memory device is in dependence on a physical processor connected to the memory device. Current mainstream processors are all integrated with a memory controller, and a memory device is directly connected to a physical processor. Therefore, before the memory device is dynamically added, it needs to first dynamically add the physical processor connected to the memory device; before the physical processor is dynamically removed, it needs to first dynamically remove the memory device connected to the physical processor.

An IOH (Input Output Hub) is connected to two physical processors respectively through two QPI buses, and the IOH also has a dependency relationship with the physical processors. If an IOH is dynamically added and joins in a working server bus network, at least one of the two physical processors connected to the IOH has to be already dynamically added.

For a multi-node server, such as a 32P system server, another important dependency relationship further exists additionally. In a schematic diagram of a topology structure shown in FIG. 2, a Node A is connected to a system bus network of the server through a Node B, a Node C, a Node D, and a Node E. Therefore, the Node A is in dependence on the Node B, the Node C, the Node D, and the Node E, and when hot-plugging is performed on the Node A, this dependency relationship has to be taken into account.

A hot-plugging driver of the OS may obtain this platform-related information, that is, dependency relationship, through the BIOS, so the BIOS needs to provide a necessary interface for the hot-plugging driver to manage dependency between devices.

The prior art only discloses a device dynamic removal method for solving device dynamic removal, and a current method for performing device dynamic removal processing is described as follows: when it is needed to dynamically remove a certain target device, an _EDL (Eject Device List) method is adopted, in which the method specifies that a BIOS parses and returns a dynamic removal dependence device list of a target device, and if a device corresponding to a node of an _EDL is dynamically removed, all devices in the dynamic removal dependence device list obtained by the _EDL should be first dynamically removed.

The existing _EDL cannot desirably process a dynamic dependency relationship between devices. Dependency between some devices is unique and static. For example, a memory device is only in dependence on a physical processor connected to the memory device. The _EDL method processes this dependency relationship very easily. Further, some dependency relationships are one-to-many and dynamic, such as a dependency relationship between an IOH and a physical processor and a dependency relationship between nodes. The substance of this type of dependency is that: during dynamic addition, a device is in dependence on any one of a group of devices; during dynamic removal, a device is in dependence on a device in a group of devices which is the last one dynamically removed. For example, as shown in FIG. 3, an IOH is connected to two processors, that is, CPU0 and CPU1, through a bus, and dynamic removal dependency relationship lists returned by _EDL methods of the two processors both include the IOH, that is, when any one processor is dynamically removed, it is needed to dynamically remove the IOH. However, normal work of the IOH may be in dependence on CPU0 or CPU1, and when CPU0 is dynamically removed, because CPU1 on which the normal work of the IOH is in dependence is still online, actually CPU0 may be directly dynamically removed without dynamically removing the IOH.

How to better implement dynamic addition and dynamic removal in device hot-plugging through a device dynamic addition dependency relationship list returned by a BIOS becomes a research hotspot.

SUMMARY OF THE INVENTION

Embodiments of the present invention provide a method and an apparatus for device dynamic addition processing, and a method and an apparatus for device dynamic removal processing, which may better implement device hot-plugging processing through an obtained device dynamic addition dependency relationship list.

An embodiment of the present invention provides a method for device dynamic addition processing, which includes:

obtaining a dynamic addition dependency relationship list of a target device to be dynamically added, where the dynamic addition dependency relationship list records several basic device units which the target device is dependent on when working in a normal status; and performing dynamic addition processing on the target device according to a state of the basic device unit in the dynamic addition dependency relationship list.

Correspondingly, an embodiment of the present invention further provides a method for device dynamic removal processing, which includes:

obtaining a dynamic removal dependency relationship list of a target device to be dynamically removed, where the dynamic removal dependency relationship list records several basic device units which are dependent on the target device when working;

if the dynamic removal dependency relationship list is null, prompting a user to dynamically remove the target device;

if the dynamic removal dependency relationship list is not null, obtaining a dynamic addition dependency relationship list of each basic device unit in the dynamic removal dependency relationship list; and performing dynamic removal processing on the target device according to a state of a basic device unit in the dynamic addition dependency relationship list.

Correspondingly, an embodiment of the present invention further provides an apparatus for device dynamic addition processing, which includes:

a first dependency relationship obtaining module, configured to obtain a dynamic addition dependency relationship list of a target device to be dynamically added, where the dynamic addition dependency relationship list records several basic device units which the target device is dependent on when working in a normal status; and a first processing module, configured to perform dynamic addition processing on the target device according to a state of the basic device unit in the dynamic addition dependency relationship list obtained by the dependency relationship obtaining module.

Correspondingly, an embodiment of the present invention further provides an apparatus for device dynamic removal processing, which includes:

a second dependency relationship obtaining module, which obtains a dynamic removal dependency relationship list of a target device to be dynamically removed, where the dynamic removal dependency relationship list records several basic device units which are dependent on the target device when working; and a second processing module, configured to: when the dynamic removal dependency relationship list is null, prompt a user to dynamically remove the target device;

obtain a dynamic addition dependency relationship list of each basic device unit in the dynamic removal relationship list through the dependency relationship obtaining module when the dynamic removal dependency relationship list is not null; and perform dynamic removal processing on the target device according to a state of a basic device unit in the dynamic addition dependency relationship list.

Implementation of the embodiments of the present invention has the following beneficial effects:

The present invention can obtain a dynamic addition dependency relationship list. During dynamic addition, that is, when a target device is to be dynamically added, dynamic addition analysis and processing may be performed on a dynamic addition dependency relationship of the target device to be dynamically added, according to the dynamic addition dependency relationship list, thereby ensuring that the target device to be dynamically added may normally work after the target device is dynamically added, and better implementing dynamic addition of the target device. Meanwhile, when the target device is dynamically removed, dynamic removal analysis and processing is performed in combination with a dynamic removal dependency relationship list and a dynamic addition dependency relationship list of the target device to be dynamically removed. When the target device is dynamically removed, it can be ensured that only the target device and some devices that have to be dynamically removed are dynamically removed, thereby maximally ensuring that work of other devices of a server is not affected, and more intelligently implementing device dynamic removal processing.

DETAILED DESCRIPTION OF THE EMBODIMENTS

The technical solutions of the embodiments of the present invention are to be clearly described in the following with reference to the accompanying drawings. It is obvious that the embodiments to be described are a part rather than all of the embodiments of the present invention. All other embodiments obtained by persons skilled in the art based on the embodiments of the present invention without creative efforts shall fall within the protection scope of the present invention.

Figure 4:
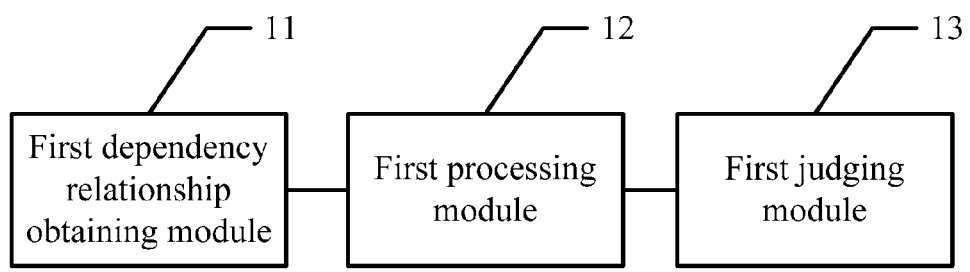
FIG. 4 is a schematic structural diagram of an apparatus for device dynamic addition processing according to an embodiment of the present invention.

Referring to FIG. 4, FIG. 4 is a schematic structural diagram of an apparatus for device dynamic addition processing according to an embodiment of the present invention, and the apparatus for device dynamic addition processing specifically includes: a first dependency relationship obtaining module 11 and a first processing module 12.

The first dependency relationship obtaining module 11 is configured to obtain a dynamic addition dependency relationship list of a target device to be dynamically added, where the dynamic addition dependency relationship list records several basic device units which the target device is dependent on when working in a normal status.

The first dependency relationship obtaining module 11 requests to obtain a dynamic addition dependency relationship list in a BIOS through a platform-unrelated interface such as an ACPI (Advanced Configuration and Power Management Interface, advanced configuration and power management interface). In the present invention, a DSM (Device Specific Method, device specific method) is defined to obtain a dynamic addition dependency relationship list, and the specific procedure may be described as follows: the first dependency relationship obtaining module 11 may write parameters used for obtaining the dynamic addition dependency relationship of a target device into the ACPI; after parsing these parameters, the ACPI transfers the parameters to the BIOS, and the BIOS completes the work of dynamic addition dependency relationship parsing that is needed for the dynamic addition of the target device; after completing the dynamic addition dependency relationship parsing, the BIOS returns a parsing result to the ACPI, that is, returns a dynamic addition dependency relationship list, and the ACPI parses data fed back by the BIOS, forms the dynamic addition dependency relationship list and feeds the dynamic addition dependency relationship list back to the first dependency relationship obtaining module 11.

The first dependency relationship obtaining module 11 may be configured to obtain dynamic addition dependency relationship lists of all devices to be dynamically added including the target device in the entire server.

The first processing module 12 is configured to perform dynamic addition processing on the target device according to a state of the basic device unit in the dynamic addition dependency relationship list obtained by the first dependency relationship obtaining module 11.

The basic device unit in this embodiment may be a single device or a sub-device group formed of several single devices, the dynamic addition dependency relationship list may be a set of several single devices and/or several sub-device groups, and after the target device is dynamically added, the target device can normally work only in dependence on these basic device units at the same time. If the target device needs to be dynamically added, the first processing module 12 needs to perform dynamic addition processing on the target device, that is, to process and analyze a dependency relationship between other devices (basic device units in the dynamic addition dependency relationship list) that are needed for the dynamic addition of the target device, thereby prompting a user whether the target device may be dynamically added, so as to ensure that the dynamically added target device may work normally.

The performing, by the first processing module 12, dynamic addition processing on the target device refers to that: the first processing module 12 judges whether a state of the basic device unit in the dynamic addition dependency relationship list satisfies a dynamic addition condition of the target device, and if the state of the basic device unit in the dynamic addition dependency relationship list satisfies a dynamic addition condition of the target device, prompts the user to dynamically add the target device, so that dynamic addition processing is performed on the target device; if the state of the basic device unit in the dynamic addition dependency relationship list does not satisfy a dynamic addition condition of the target device, the first processing module 12 determines a basic device unit in the dynamic addition dependency relationship list as a current basic device unit, where the basic device unit results in that the target device does not satisfy the dynamic addition condition, then instructs the first dependency relationship obtaining module 11 to obtain a dynamic addition dependency relationship list of the current basic device unit, then performs dynamic addition processing on the current basic device unit according to the dynamic addition dependency relationship list of the current basic device unit, and after dynamic addition processing is performed on the current basic device unit, prompts the user to dynamically add the target device Satisfying the dynamic addition condition of the target device may refer to that basic device units in the dynamic addition dependency relationship list are all in an online state, and specifically refer to that single devices in the dynamic addition dependency relationship list are all in an online state, and at least one of devices in the sub-device group is in an online state. Only in this way, the target device can work normally after being dynamically added. Not satisfying the dynamic addition condition of the target device refers to that at least one basic device unit in the dynamic addition dependency relationship list is in an offline state, that is, at least one single device is in an offline state or devices in at least one sub-device group are all in an offline state.

The instructing, by the first processing module 12, the first dependency relationship obtaining module 11 to obtain the dynamic addition dependency relationship list of the current basic device unit, and performing dynamic addition processing on the current basic device unit include:

recording an upper level basic device unit, on which the current basic device unit is in dependence, in the dynamic addition dependency relationship list of the current basic device unit obtained by the first dependency relationship obtaining module 11. The first processing module 12 judges whether a state of the upper level basic device unit in the dynamic addition dependency relationship list of the current basic device unit satisfies a dynamic addition condition of the current basic device unit (whether single devices are all online, and whether at least one of sub-device groups is online); if the state of the upper level basic device unit in the dynamic addition dependency relationship list of the current basic device unit satisfies a dynamic addition condition of the current basic device unit, prompts the dynamic addition of the current basic device unit so that dynamic addition processing is performed on the current basic device unit; and if the state of the upper level basic device unit in the dynamic addition dependency relationship list of the current basic device unit does not satisfy a dynamic addition condition of the current basic device unit, the first processing module 12 determines an upper level basic device unit, which results in that the dynamic addition condition of the current basic device unit is not satisfied, as a current basic device unit, instructs the first dependency relationship obtaining module 11 to obtain the dynamic addition dependency relationship list of the current basic device unit determined in this step, and then performs the foregoing dynamic addition processing, that is, performs iteration processing, until dynamic addition processing is performed on all current basic device units.

After the prompt that the current basic device unit may be dynamically added is completed, a prompt that the target device may be dynamically added is performed; in other words, after it is judged that all current basic device units may be dynamically added, a dynamic addition sequence list may be generated, that is, it is prompted that current basic device units are dynamically added sequentially first, and finally the target device is dynamically added.

During specific implementation, a circular dependency relationship occurs between some devices. When A is ready to be dynamically added, the dynamic addition dependency relationship list of the device A obtained by the first dependency relationship obtaining module 11 includes a device B which however is not online, so that the device A cannot be dynamically added, and therefore it needs to obtain the dynamic addition dependency relationship list of the device B. However, the dynamic addition dependency relationship list of the device B obtained by the first dependency relationship obtaining module 11 includes the device A, while the device A is a device to be dynamically added and is not online. When the first processing module 12 performs dynamic addition processing on the device A, the device B needs to be dynamically added, and when dynamic addition processing is further performed on the device B, it is also found that the device A needs to be dynamically added first, thereby resulting in an infinite loop of dynamic addition processing. Therefore, the apparatus for device dynamic addition processing of this embodiment may further include a judging module 13 for judging the circular dependency relationship, so as to avoid the infinite loop of dynamic addition processing. The judging module 13 is configured to judge whether a circular dependency relationship exists in the procedure that the first processing module 12 performs dynamic addition processing on the target device, and when the circular dependency relationship exists, instruct the first processing module 12 to stop performing the dynamic addition processing; if no circular dependency relationship exists, the first processing module 12 works normally.

Additionally, the first dependency relationship obtaining module 11 may include:

a parameter input unit, configured to input a parameter used for obtaining the dynamic addition dependency relationship of the target device through a platform-unrelated interface connected to a basic input output system BIOS, so that the basic input output system BIOS parses the dynamic addition dependency relationship of the target device, and after the dynamic addition dependency relationship of the target device is parsed, returns the dynamic addition dependency relationship list of the target device through the platform-unrelated interface; and an obtaining unit, configured to obtain the dynamic addition dependency relationship list of the target device returned by the basic input output system BIOS.

That is, the first dependency relationship obtaining module 11 obtains the dynamic addition dependency relationship list of the target device or each current basic device unit in the BIOS through a platform-unrelated interface ACPI and through the parameter input unit and the obtaining unit.

It may be known through the description of the foregoing embodiment that, the present invention has the following advantages:

The present invention can obtain a dynamic addition dependency relationship list. During dynamic addition, that is, when a target device is dynamically added, dynamic addition analysis and processing may be performed, according to the dynamic addition dependency relationship list, on a dynamic addition dependency relationship of the target device to be dynamically added, thereby ensuring that the target device to be dynamically added may work normally after dynamic addition, and better implementing dynamic addition of the target device. Additionally, the present invention can further judge, according to the dynamic addition dependency relationship list, whether circular dependency exists, and stop performing dynamic addition processing on a device during occurrence of circular dependency, thereby avoiding occurrence of an infinite loop, and further ensuring dynamic addition of a device and normal work of a server.

Figure 5:
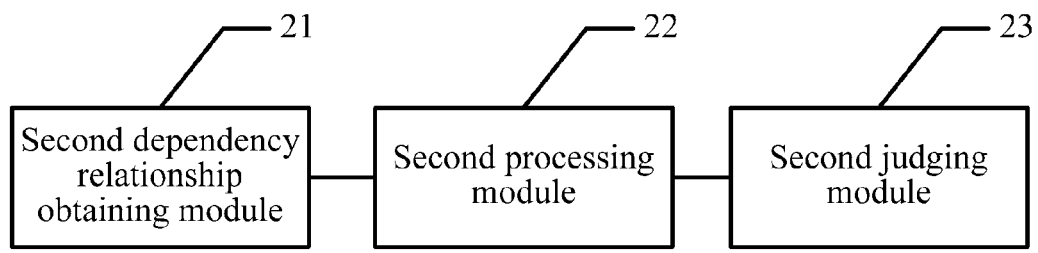
FIG. 5 is a schematic structural diagram of an apparatus for device dynamic removal processing according to an embodiment of the present invention.

Then referring to FIG. 5, FIG. 5 is a schematic structural diagram of an apparatus for device dynamic removal processing according to an embodiment of the present invention, and the apparatus for device dynamic removal processing specifically includes: a second dependency relationship obtaining module 21 and a second processing module 22.

The second dependency relationship obtaining module 21 obtains a dynamic removal dependency relationship list of a target device to be dynamically removed, where the dynamic removal dependency relationship list records several basic device units which are dependent on the target device when working The second dependency relationship obtaining module 21 may obtain the dynamic removal dependency relationship list in the BIOS through the existing EDL method, and obtain the dynamic addition dependency relationship list in the BIOS through the foregoing DSM method. The second dependency relationship obtaining module 21 may also obtain the dynamic removal dependency relationship list and the dynamic addition dependency relationship list in the BIOS through a platform-unrelated interface such as an ACPI, and the work procedure of the second dependency relationship obtaining module 21 is the same as that of the first dependency relationship obtaining module 11, and is not repeated here.

The second processing module 22 is configured to: when the dynamic removal dependency relationship list is null, prompt the user to dynamically remove the target device, and obtain the dynamic addition dependency relationship list of each basic device unit in the dynamic removal relationship list through the second dependency relationship obtaining module 21 when the dynamic removal dependency relationship list is not null; and perform dynamic removal processing on the target device according to a states of a basic device unit in the dynamic addition dependency relationship list.

If the dynamic removal dependency relationship list obtained by the second dependency relationship obtaining module 21 is null, it indicates that no other devices, which are dependent on the target device when working, exist, and the second processing module 22 may directly prompt the user to directly dynamically remove the target device. However, if the dynamic removal dependency relationship list obtained by the second dependency relationship obtaining module 21 is not null, it indicates that other devices, which are dependent on the target device when working, exist in the server, and the second processing module 22 needs to perform dynamic removal processing, that is, to analyze and process a dependency relationship of these other devices which are dependent on the target device when working, to prompt the user whether the target device may be dynamically removed, so as to dynamically remove the target device while ensuring normal work of other devices in the server.

When the dynamic removal dependency relationship list is not null, the second processing module 22 obtains the dynamic addition dependency relationship list of each basic device unit in the dynamic removal relationship list through the second dependency relationship obtaining module 21, and performs dynamic removal processing on the target device according to a state of a basic device unit in the dynamic addition dependency relationship list.

Specifically, the second processing module 22 judges whether a state of a basic device unit in the dynamic addition dependency relationship list of each basic device unit of the dynamic removal relationship list satisfies a dynamic removal condition of the target device, which is specifically judging whether, in addition to the target device, at least one other basic device unit in the basic device units in the dynamic addition dependency relationship list of each basic device unit of the dynamic removal relationship list is in an online state (at least one single device is in an online state or a single device in at least one sub-device group is in an online state).

If yes, it indicates that after the target device is dynamically removed, a basic device unit in the server in dependence on the target device may continue to work, and the target device may be directly dynamically removed. The second processing module 22 prompts the user to dynamically remove the target device.

If no, it indicates that after the target device is dynamically removed, a basic device unit existing in the server in dependence on the target device cannot work normally. In this case, the second processing module 22 determines a basic device unit in the dynamic removal dependence list as a current basic device unit, where the basic device unit results in that the dynamic removal condition of the target device is not satisfied, performs dynamic removal processing on the current basic device unit, and after the dynamic removal processing is performed on the current basic device unit, prompts the user to dynamically remove the target device.

The procedure of performing, by the second processing module 22, dynamic removal processing on the determined current basic device unit is the same as the dynamic removal processing procedure of the target device. The second dependency relationship obtaining module 21 obtains a dynamic removal dependency relationship list of the current basic device unit, where the dynamic removal dependency relationship list of the current basic device unit records a lower level basic device unit in dependence on the current basic device unit.

If the dynamic removal dependency relationship list of the current basic device unit is null, the user is prompted to dynamically remove the current basic device unit, so that dynamic removal processing is performed on the current basic device unit, and after the dynamic removal processing is performed on the current basic device unit, the user is prompted to dynamically remove the target device.

If the dynamic removal dependency relationship list is not null, a dynamic addition dependency relationship list of each lower level basic device unit in the dynamic removal dependency relationship list of the current basic device unit is obtained, and the second processing module 22 judges whether a state of a basic device unit in the dynamic addition dependency relationship list of each lower level basic device unit satisfies a dynamic removal condition of the current basic device unit. If the state of a basic device unit in the dynamic addition dependency relationship list of each lower level basic device unit satisfies a dynamic removal condition of the current basic device unit, the user is prompted to dynamically remove the current basic device unit, so that dynamic removal processing is performed on the current basic device unit, and after the dynamic removal processing is performed on the current basic device unit, the user is prompted to dynamically remove the target device; if the state of a basic device unit in the dynamic addition dependency relationship list of each lower level basic device unit does not satisfy a dynamic removal condition of the current basic device unit, a lower level basic device unit, which results in that the dynamic removal condition of the current basic device unit is not satisfied, is determined as a current basic device unit, and then the second processing module 22 performs dynamic removal processing on the current basic device unit determined in this step, until dynamic removal processing is performed on all current basic device units, that is, performs iteration processing, until the dynamic removal processing is performed on all current basic device units.

After the prompt that the current basic device unit may be dynamically removed is completed, a prompt that the target device may be dynamically removed is performed; in other words, after it is judged that all current basic device units may be dynamically removed, a dynamic removal sequence list may be generated, that is, it is prompted that current basic device units are dynamically removed sequentially first, and finally the target device is dynamically removed.

Likewise, during specific implementation, in order to solve the problem of the infinite loop caused by the circular dependency relationship, the apparatus for device dynamic removal processing of this embodiment may further include a second judging module 23, configured to judge whether circular dependency exists in the procedure that the second processing module 22 performs dynamic removal processing, and instruct the second processing module 22 to stop performing dynamic removal processing when the circular dependency relationship exists.

It may be known through the description of the foregoing embodiment that, the present invention has the following advantages:

When the target device is dynamically removed, dynamic removal analysis and processing is performed in combination with a dynamic removal dependency relationship list and a dynamic addition dependency relationship list of the target device to be dynamically removed; when the target device is dynamically removed, the present invention can ensure that only the target device and some devices, which have to be dynamically removed, are dynamically removed, thereby maximally ensuring that work of other devices of a server is not affected, and more intelligently implementing device dynamic removal processing. Additionally, the present invention can further judge, according to the dynamic addition dependency relationship list, whether circular dependency exists, and stop performing dynamic removal processing on a device during occurrence of circular dependency, thereby avoiding occurrence of an infinite loop, and further ensuring dynamic removal of a device and normal work of a server.

The apparatus for device dynamic addition processing and the apparatus for device dynamic removal processing may be located in a server at the same time and perform device dynamic removal processing.

Definitely, the apparatus for device dynamic addition processing and the apparatus for device dynamic removal processing may be further disposed in other electronic devices such as a computer, and implement device dynamic removal processing.

The method for device dynamic addition processing of the present invention is illustrated below.

Figure 6:
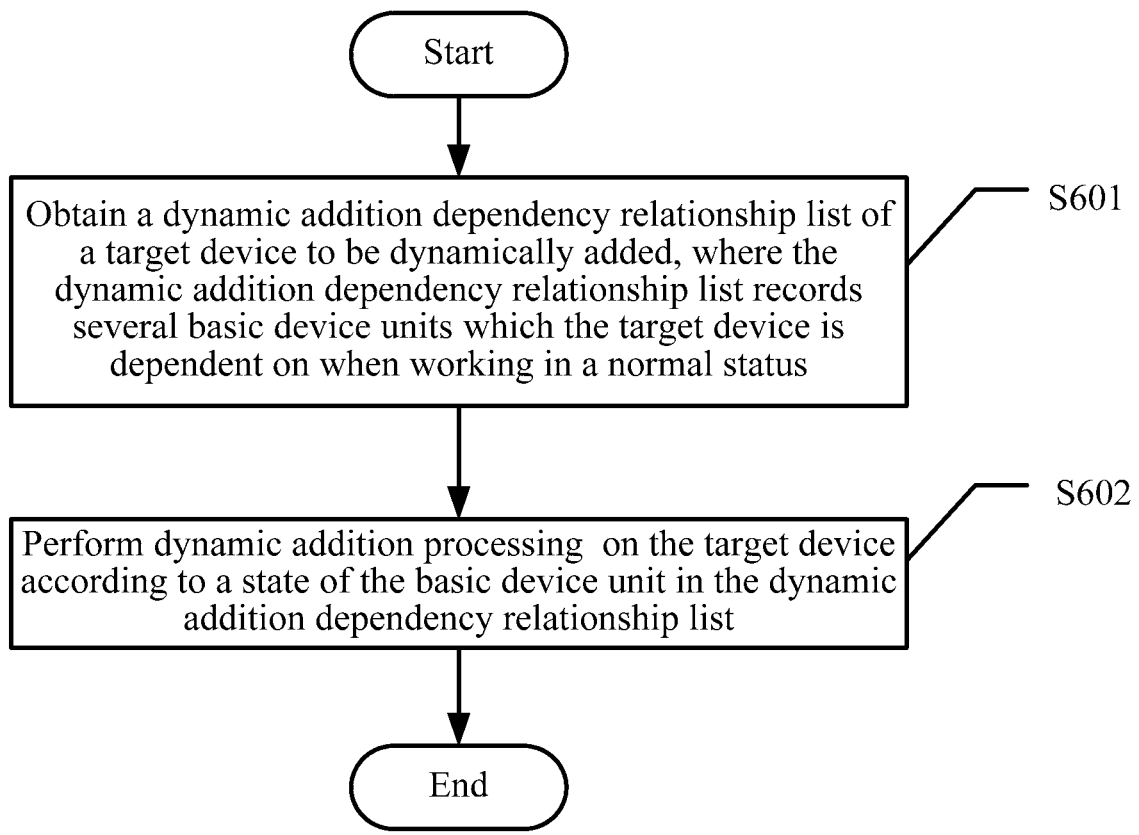
FIG. 6 is a schematic flow chart of a method for device dynamic addition processing according to an embodiment of the present invention.

Referring to FIG. 6, FIG. 6 is a schematic flow chart of a method for device dynamic addition processing of an embodiment of the present invention, and the method for device dynamic addition processing of this embodiment specifically includes the following steps:

S601: Obtain a dynamic addition dependency relationship list of a target device to be dynamically added, where the dynamic addition dependency relationship list records several basic device units which the target device is dependent on when working in a normal status.

Specifically, the step of obtaining the dynamic addition dependency relationship list of the target device to be dynamically added may include:

inputting a parameter, which is used for obtaining a dynamic addition dependency relationship of the target device, through a platform-unrelated interface connected to a basic input output system BIOS, so that the basic input output system BIOS parses, and after the dynamic addition dependency relationship of the target device is parsed, returns the dynamic addition dependency relationship list of the target device through the platform-unrelated interface.

In the step S601, it is requested to obtain a dynamic addition dependency relationship list in a BIOS through a platform-unrelated interface such as an ACPI (Advanced Configuration and Power Management Interface, advanced configuration and power management interface). This method defines a DSM (Device Specific Method, device specific method) to obtain a dynamic addition dependency relationship list, and the specific procedure is described as follows: parameters used for obtaining a dynamic addition dependency relationship of a target device may be written into the ACPI in the step S601; after parsing these parameters, the ACPI transfers the parameters to the BIOS, and the BIOS completes work of dynamic addition dependency relationship parsing that is needed for the dynamic addition of the target device; after completing the dynamic addition dependency relationship parsing, the BIOS returns a parsing result to the ACPI, that is, returns a dynamic addition dependency relationship list, and the ACPI parses data fed back by the BIOS, and forms the dynamic addition dependency relationship list to be fed back. In this way, in the step S601, the dynamic addition dependency relationship list, which is needed for specific dynamic addition of the target device, is obtained.

S602: Perform dynamic addition processing on the target device according to a state of the basic device unit in the dynamic addition dependency relationship list.

The basic device unit in this embodiment may be a single device or a sub-device group formed of several single devices, the dynamic addition dependency relationship list may be a set of several single devices and/or several sub-device groups, and after the target device is dynamically added, the target device can normally work only in dependence on these basic device units at the same time. If the target device is dynamically added, the first processing module 12 needs to perform dynamic addition processing on the target device, that is, to process and analyze a dependency relationship of other devices (basic device units in the dynamic addition dependency relationship list) that are needed for the dynamic addition of the target device, thereby prompting a user whether the target device may be dynamically added, so as to ensure that the dynamically added target device may work normally.

The performing dynamic addition processing on the target device in the step S602 specifically includes:

judging whether the state of the basic device unit in the dynamic addition dependency relationship list satisfies a dynamic addition condition of the target device;

if the state of the basic device unit in the dynamic addition dependency relationship list satisfies a dynamic addition condition of the target device, prompting a user to dynamically add the target device; and if the state of the basic device unit in the dynamic addition dependency relationship list does not satisfy a dynamic addition condition of the target device, determining a basic device unit in the dynamic addition dependency relationship list as a current basic device unit, where the basic device unit results in that the target device does not satisfy the dynamic addition condition, performing dynamic addition processing on the current basic device unit, and after the dynamic addition processing is performed on the current basic device unit, prompting the user to dynamically add the target device.

Satisfying the dynamic addition condition of the target device may refer to that basic device units in the dynamic addition dependency relationship list are all in an online state, and specifically refer to that single devices in the dynamic addition dependency relationship list are all in an online state, and at least one of devices in the sub-device group is in an online state. Only in this way, the target device can work normally after being dynamically added. Not satisfying the dynamic addition condition of the target device refers to that at least one basic device unit in the dynamic addition dependency relationship list is in an offline state, that is, at least one single device is in an offline state or devices in at least one sub-device group are all in an offline state.

The performing dynamic addition processing on the current basic device unit includes:

obtaining a dynamic addition dependency relationship list of the current basic device unit, where the dynamic addition dependency relationship list of the current basic device unit records an upper level basic device unit on which the current basic device unit is in dependence;

judging whether a state of the upper level basic device unit in the dynamic addition dependency relationship list of the current basic device unit satisfies a dynamic addition condition of the current basic device unit, that is, judging whether each of the upper level basic device units in the list is in an online state (single devices in the list are all online, and at least one single device in the sub-device group is online), and if all online, the dynamic addition condition is satisfied; otherwise, not satisfied;

if satisfied, prompting the dynamic addition of the current basic device unit so that dynamic addition processing is performed on the current basic device unit; and if not satisfied, determining an upper level basic device unit, which results in that the dynamic addition condition of the current basic device unit is not satisfied, as a current basic device unit, and performing dynamic addition processing on the current basic device unit determined in this step, until dynamic addition processing is performed on all current basic device units, that is, performing iteration processing until dynamic addition processing is performed on all current basic device units.

After the prompt that the current basic device unit may be dynamically added is completed, a prompt that the target device may be dynamically added is performed; in other words, after it is judged that all current basic device units may be dynamically added, a dynamic addition sequence list may be generated, that is, it is prompted that current basic device units are dynamically added sequentially first, and finally the target device is dynamically added.

Additionally, in the procedure of performing dynamic addition processing in step S602, it further needs to perform the step of judging whether a circular dependency relationship exists, and if the circular dependency relationship exists, the dynamic addition processing is stopped from being performed. In the step, judgment is performed according to the obtained dynamic addition relationship dependence list. The circular dependency relationship refers to that, when A is ready to be dynamically added, the obtained dynamic addition dependency relationship list of the device A includes a device B which however is not online, so that the device A cannot be dynamically added, and therefore it needs to obtain the dynamic addition dependency relationship list of the device B. However, the obtained dynamic addition dependency relationship list of the device B includes the device A, while the device A is a device to be dynamically added and is not online. When dynamic addition processing is performed on the device A in the step S602, it needs to dynamically add the device B, and when dynamic addition processing is further performed on the device B, it is also found that the device A needs to be dynamically added first, thereby resulting in an infinite loop of dynamic addition processing. Therefore, it needs to perform the step of judging whether the circular dependency relationship exists, so as to avoid the infinite loop.

Figure 7:
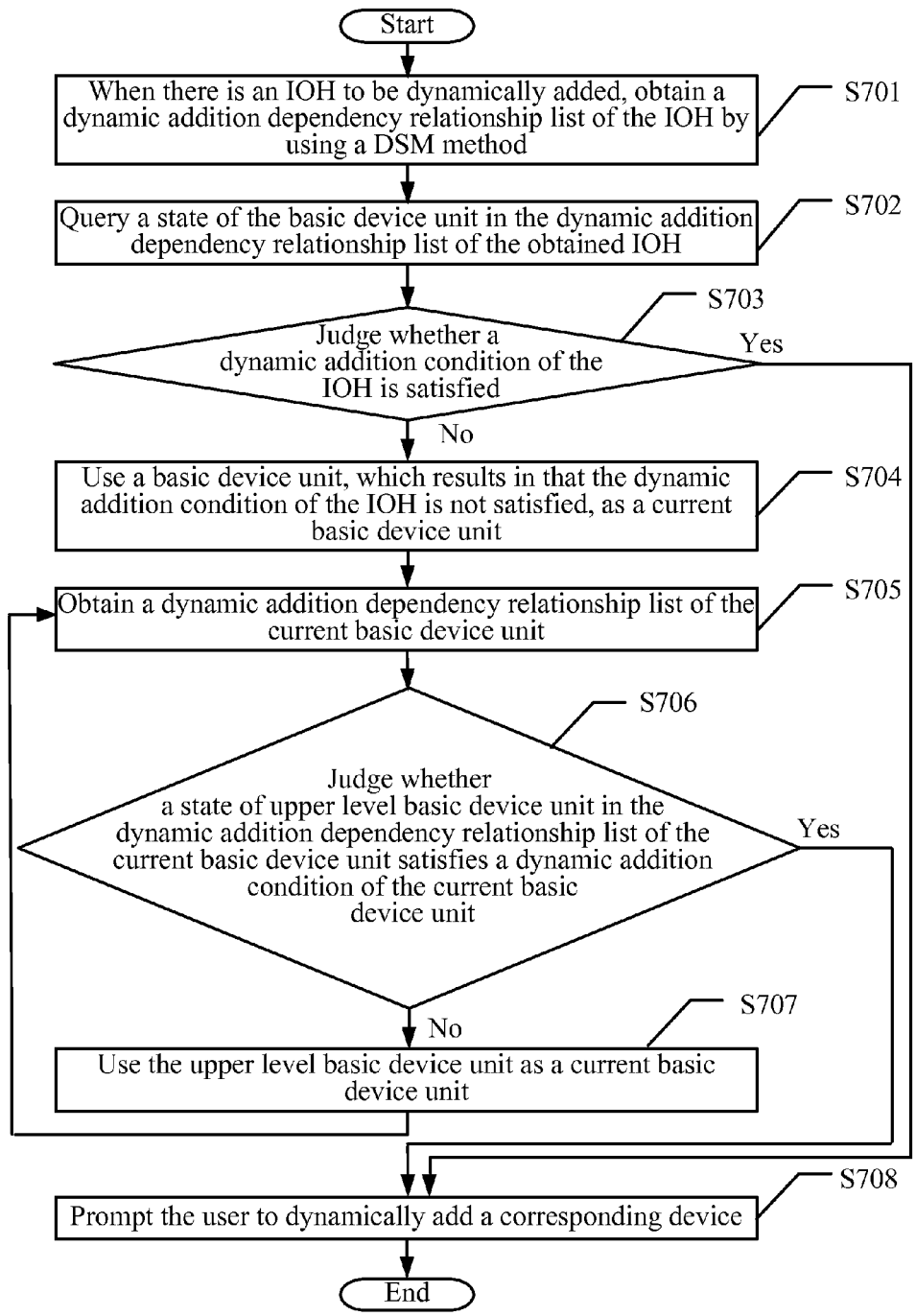
FIG. 7 is a schematic flow chart of a method for device dynamic addition processing in a server according to the present invention.

Referring to FIG. 7, a specific method for device dynamic addition processing according to the present invention is described. As shown in FIG. 7, the method includes the following steps:

S701: When there is an IOH to be dynamically added, obtain a dynamic addition dependency relationship list of the IOH by using a DSM method.

Figure 8:
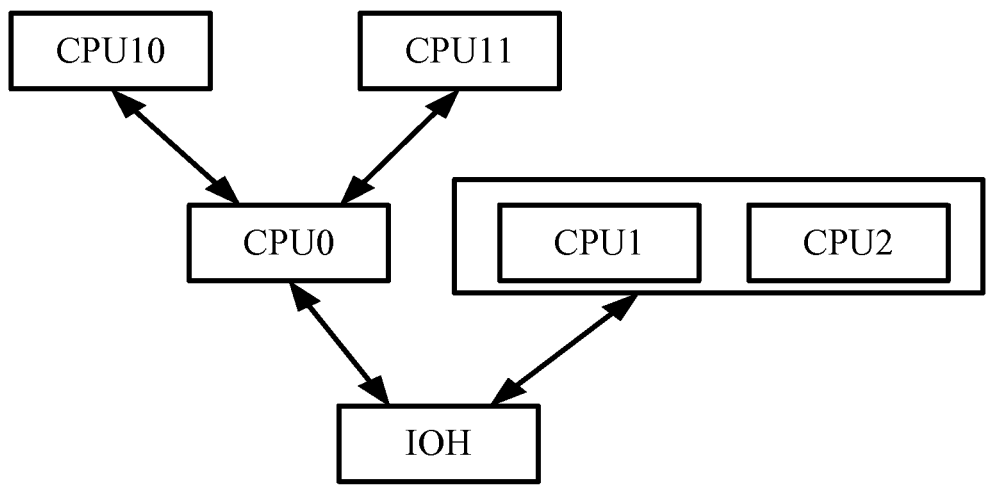
FIG. 8 is a schematic diagram of a dependency relationship between devices in the server in FIG. 7.

A BIOS parses and obtains that those having a dependency relationship with the IOH include a CPU0, a CPU1 and a CPU2, and obtains that the CPU1 and the CPU2 are a sub-device group. As long as one of the CPU1 and the CPU2 is online, a basic device unit formed of the CPU1 and the CPU2 is in an online state. The BIOS identifies the CPU1 and the CPU2 as a sub-device group, and adds the sub-device group into the dynamic addition dependency relationship list. Specifically referring to FIG. 8, FIG. 8 is a schematic diagram of a dependency relationship between devices in the server in FIG. 7.

S702: Query a state of the basic device unit in the obtained dynamic addition dependency relationship list of the IOH, that is, query states of the CPU0, the CPU1 and the CPU2.

S703: Judge whether a dynamic addition condition of the IOH is satisfied.

The dynamic addition condition is that after the IOH is dynamically added to a server system, other devices, on which the IOH is in dependence, exist, so that the IOH can work normally.

If the CPU0 is online, and the CPU1 in the sub-device group is online (or the CPU2 is online, or the CPU1 and the CPU2 are both online), the dynamic addition condition of the IOH is satisfied, step S708 is performed, direct dynamic addition is prompted to the user, and the dynamic addition processing of the target device ends.

If the CPU0 is not online, the dynamic addition condition of the IOH is not satisfied, and step S704 is performed; meanwhile the user is prompted that if an IOH needs to be dynamically added, it needs to dynamically add the CPU0, and the CPU0 is used as a current basic device unit.

In this embodiment, the CPU0 is not online.

S704: Use a basic device unit, which results in that the dynamic addition condition of the IOH is not satisfied, as a current basic device unit, that is, use the CPU0 as a current basic device unit.

S705: Obtain a dynamic addition dependency relationship list of the current basic device unit.

The dynamic addition dependency relationship list of the CPU0 used as the current basic device unit is obtained, and the dynamic addition dependency relationship list of the CPU0 includes upper level basic device units: a CPU10 and a CPU11.

S706: Judge whether a state of the upper level basic device unit in the dynamic addition dependency relationship list of the current basic device unit satisfies a dynamic addition condition of the current basic device unit.

If the CPU10 and the CPU11 are both online, the dynamic addition condition of the current basic device unit CPU0 is satisfied, and step S708 is performed. It is directly prompted that the current basic device unit, that is, the CPU0 may be dynamically added, and dynamic addition processing of the current basic device unit is completed. Then, it is prompted that after the CPU0 is dynamically added first, the target device IOH is dynamically added. After the CPU0 is dynamically added, a dynamic addition prompt table may be directly generated according to an agreement to sequentially display the CPU0 and the IOH, and after examining this table, the user knows that the CPU0 is dynamically added first and then the IOH is dynamically added, and then the process ends.

If either the CPU10 or the CPU11 is not online or neither of them is online, for example, if the CPU10 is not online, the dynamic addition condition of the current basic device unit CPU0 is not satisfied, and step S707 is performed, and the user is prompted that if it needs to dynamically add the CPU0, it needs to dynamically add the CPU10.

S707: Use the upper level basic device unit as a current basic device unit, repeatedly perform step S705, and perform iteration processing until dynamic addition processing is performed on all current basic device units.

S708: Prompt the user to dynamically add a corresponding device.

In the step S708, when a judging result of step S703 is yes, the user is prompted to dynamically add the device IOH; while when a judging result of step S706 is yes, it is prompted that one or more corresponding basic device units such as the CPU0 are first dynamically added, and then the IOH is dynamically added.

Implementation of the embodiments of the present invention has the following beneficial effects:

The present invention can obtain a dynamic addition dependency relationship list. During dynamic addition, that is, when a target device is dynamically added, dynamic addition analysis and processing may be performed on a dynamic addition dependency relationship of the target device to be dynamically added, according to the dynamic addition dependency relationship list, thereby ensuring that the target device to be dynamically added may work normally after dynamic addition, and better implementing dynamic addition of the target device. Additionally, the present invention can further judge, according to the dynamic addition dependency relationship list, whether circular dependency exists, and stop performing dynamic addition processing on a device during occurrence of circular dependency, thereby avoiding occurrence of an infinite loop, and further ensuring dynamic addition of a device and normal work of a server.

The method for device dynamic removal processing of the present invention is described in detail below.

Figure 9:
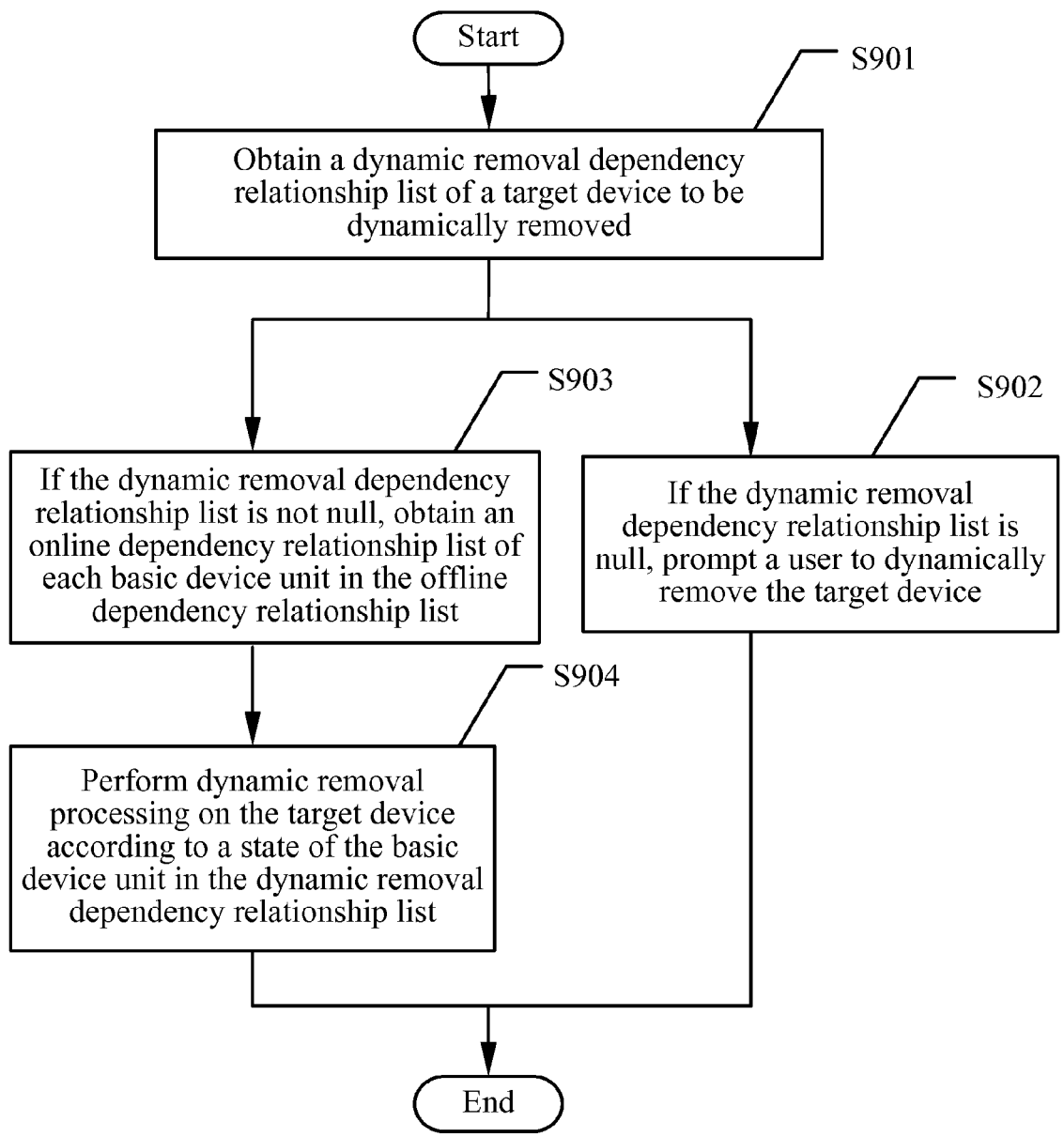
FIG. 9 is a schematic flow chart of a method for device dynamic removal processing according to an embodiment of the present invention.

Referring to FIG. 9, FIG. 9 is a schematic flow chart of a method for device dynamic removal processing of an embodiment of the present invention, and the method for device dynamic removal processing of this embodiment specifically includes the following steps:

S901: Obtain a dynamic removal dependency relationship list of a target device to be dynamically removed, where the dynamic removal dependency relationship list records several basic device units which are dependent on the target device when working.

In the step S901, the dynamic removal dependency relationship list may be obtained in a BIOS through the existing EDL method.

S902: If the dynamic removal dependency relationship list is null, prompt a user to dynamically remove the target device.

S903: If the dynamic removal dependency relationship list is not null, obtain a dynamic addition dependency relationship list of each basic device unit in the dynamic removal dependency relationship list.

S904: Perform dynamic removal processing on the target device according to a state of a basic device unit in the dynamic removal dependency relationship list.

If the dynamic removal dependency relationship list obtained in the step S901 is null, it indicates that no other devices, which are dependent on the target device when working, exist, and the user may be directly prompted to directly dynamically remove the target device in the step S902. However, if the dynamic removal dependency relationship list obtained in the step S901 is not null, it indicates that other devices, which are in dependent on the target device when working, exist in the server, and it needs to obtain the dynamic addition dependency relationship list in the BIOS through the DSM method in the embodiment of the method for device dynamic addition processing in the step S903. Dynamic removal processing is performed on the target device in step S904, that is, a dependency relationship of these other devices, which are in dependent on the target device when working, is analyzed and processed, to prompt the user whether the target device may be dynamically removed, so as to dynamically remove the target device while ensuring normal work of other devices in the server.

In the step S904, dynamic removal processing is performed on the target device according to a state of a basic device unit in the dynamic addition dependency relationship list of each basic device unit in the dynamic removal relationship list obtained in the step S903.

Specifically, it is judged in the step S904 whether a state of a basic device unit in the dynamic addition dependency relationship list of each basic device unit of the dynamic removal relationship list satisfies a dynamic removal condition of the target device. The dynamic removal condition is that after the user dynamically removes the target device, other devices in the server, which are dependent on the target device when working, can still work normally, and may specifically include judging whether, in addition to the target device, at least one other basic device unit in the basic device units in the dynamic addition dependency relationship list of each basic device unit of the dynamic removal relationship list is in an online state (at least one single device is in an online state or a single device in at least one sub-device group is in an online state).

If yes, it indicates that after the target device is dynamically removed, a basic device unit in the server in dependence on the target device may continue to work in dependence on other devices. The target device may be directly dynamically removed, and the user is prompted to dynamically remove the target device in the step S904.

If no, it indicates that after the target device is dynamically removed, a basic device unit, which is in dependence on the target device and cannot work normally, exists in the server. In this case, in the step S904, a basic device unit in the dynamic removal dependence list is determined as a current basic device unit, where the basic device unit results in that the dynamic removal condition of the target device is not satisfied, dynamic removal processing is performed on the current basic device unit, and after the dynamic removal processing is performed on the current basic device unit, the user is prompted to dynamically remove the target device.

The procedure of performing dynamic removal processing on the determined current basic device unit in the step S904 is the same as the dynamic removal processing procedure of the target device. First, a dynamic removal dependency relationship list of the current basic device unit is obtained, where the dynamic removal dependency relationship list of the current basic device unit records a lower level basic device unit in dependence on the current basic device unit.

If the dynamic removal dependency relationship list of the current basic device unit is null, the user is prompted to dynamically remove the current basic device unit, so that dynamic removal processing is performed on the current basic device unit, and after the dynamic removal processing is performed on the current basic device unit, the user is prompted to dynamically remove the target device.

If the dynamic removal dependency relationship list is not null, a dynamic addition dependency relationship list of each lower level basic device unit in the dynamic removal dependency relationship list of the current basic device unit is obtained, and it is judged in the step S904 whether a state of a basic device unit in the dynamic addition dependency relationship list of each lower level basic device unit satisfies a dynamic removal condition of the current basic device unit. If the state of the basic device unit in the dynamic addition dependency relationship list of each lower level basic device unit satisfies a dynamic removal condition of the current basic device unit, the user is prompted to dynamically remove the current basic device unit, so that dynamic removal processing is performed on the current basic device unit, and after the dynamic removal processing is performed on the current basic device unit, the user is prompted to dynamically remove the target device; if the state of the basic device unit in the dynamic addition dependency relationship list of each lower level basic device unit does not satisfy a dynamic removal condition of the current basic device unit, a lower level basic device unit, which results in that the dynamic removal condition of the current basic device unit is not satisfied, is determined as a current basic device unit, and then in the step S904, dynamic removal processing is performed on the current basic device unit determined in this step, until dynamic removal processing is performed on all current basic device units, that is, iteration processing is performed until dynamic removal processing is performed on all current basic device units.

After the prompt that the current basic device unit may be dynamically removed is completed, a prompt that the target device may be dynamically removed is performed; in other words, after it is judged that all current basic device units may be dynamically removed, a dynamic removal sequence list may be generated, that is, it is prompted that current basic device units are dynamically removed sequentially first, and finally the target device is dynamically removed.

Likewise, during specific implementation, in order to solve the problem of the infinite loop caused by the circular dependency relationship, in this embodiment, in the procedure of performing dynamic removal processing in the step S904, it is judged whether circular dependency exists, and when a circular dependency relationship exists, the dynamic removal processing is stopped from being performed.

Figure 10:
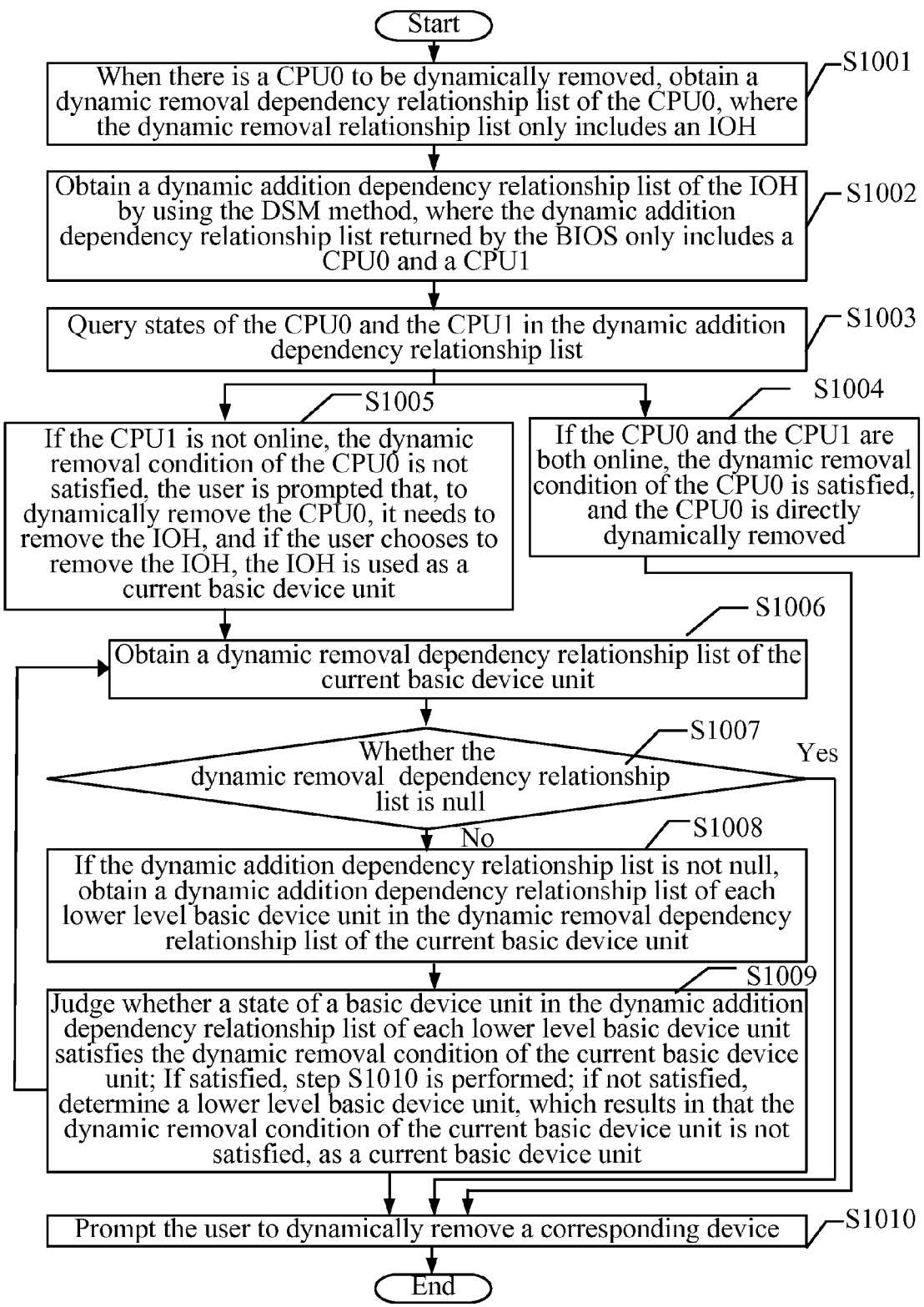
FIG. 10 is a schematic flow chart of a specific method for device dynamic removal processing according to the present invention.

Then referring to FIG. 10, FIG. 10 is a schematic flow chart of a specific method for device dynamic removal processing according to the present invention, and the method of this embodiment specifically includes the following steps:

S1001: When there is a CPU0 to be dynamically removed, obtain a dynamic removal dependency relationship list of the CPU0, where the dynamic removal relationship list only includes an IOH.

Figure 1:
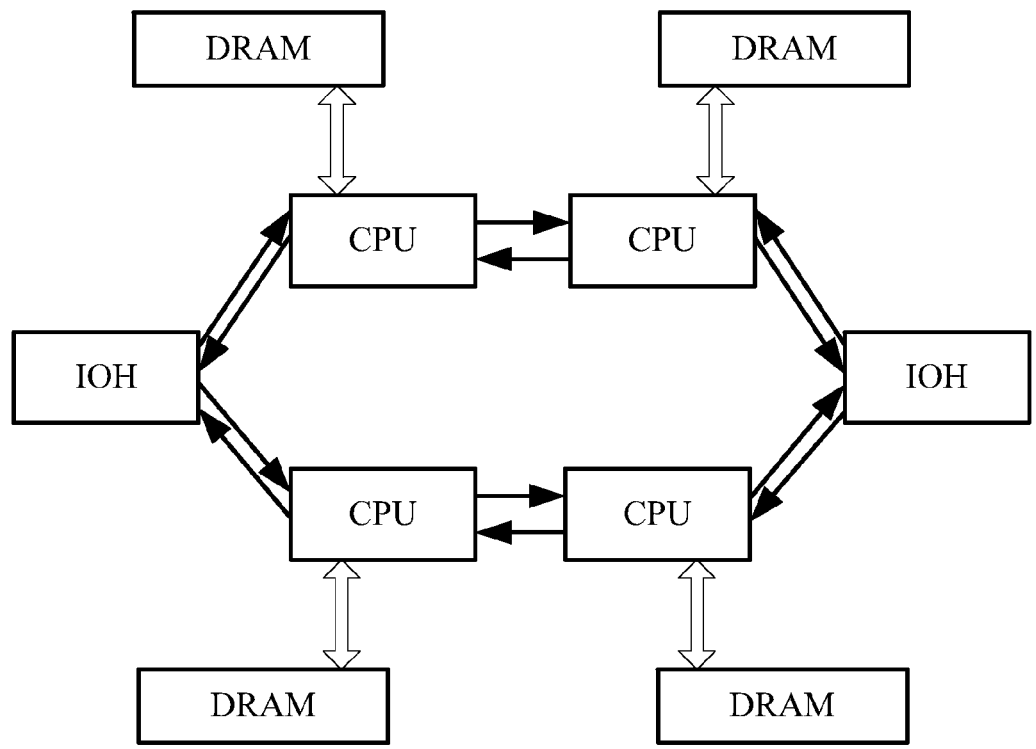
FIG. 1 is a schematic diagram of a topology structure of an existing 4-way server.
Figure 2:
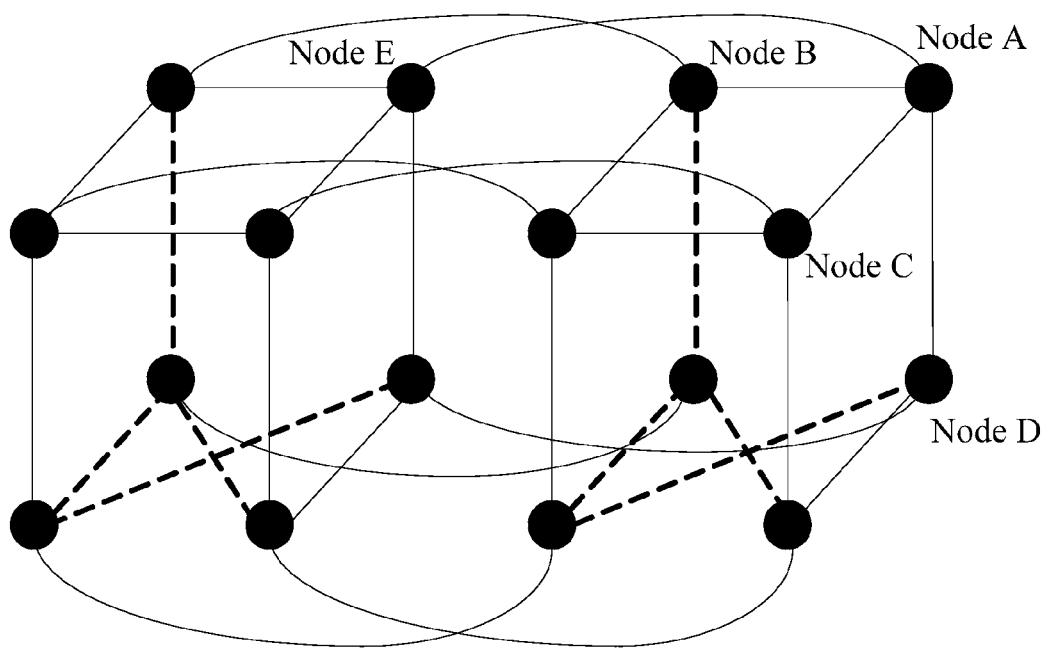
FIG. 2 is a schematic diagram of a topology structure of an existing 32-way server.
Figure 3:
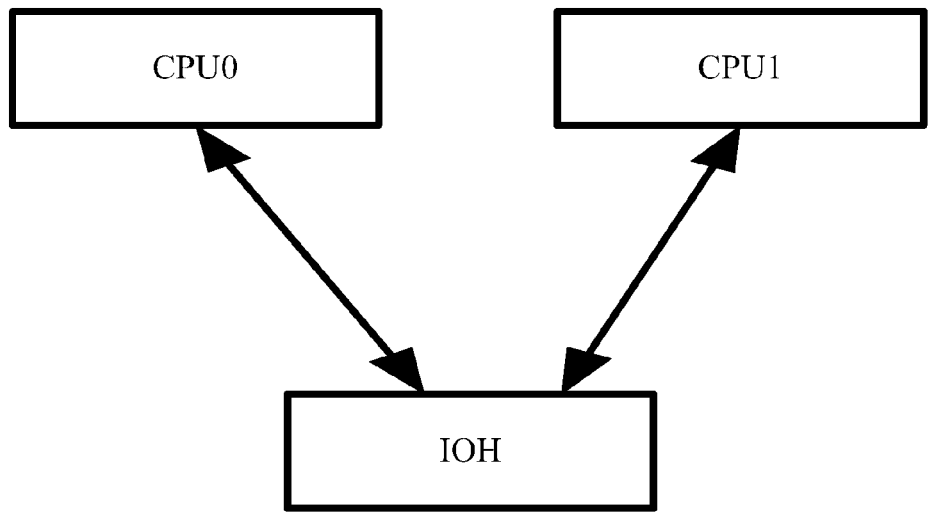
FIG. 3 is a schematic diagram of a dependency relationship between devices of an existing 2-way server.

The EDL method is used to obtain the dynamic removal dependency relationship list of the CPU0, and if the dynamic removal dependency relationship list returned by the BIOS is null, the CPU0 is directly dynamically removed, and the process ends. In this embodiment, the dynamic removal dependency relationship list returned by the BIOS includes the IOH. In this embodiment, specifically, a dependency relationship between devices of the 2-way server shown in FIG. 3 is taken as an example.

S1002: Obtain a dynamic addition dependency relationship list of the IOH by using the DSM method, where the dynamic addition dependency relationship list returned by the BIOS only includes a CPU0 and a CPU1.

S1003: Query states of the CPU0 and the CPU1 in the dynamic addition dependency relationship list.

S1004: If the CPU0 and the CPU1 are both online, the dynamic removal condition of the CPU0 is satisfied, the CPU0 is directly dynamically removed, and step S1010 is performed. That is, in addition to the CPU0 to be dynamically removed, the CPU1, on which the IOH is in dependence, is online, and the IOH can further work normally, so the dynamic removal condition of the CPU0 is satisfied.

S1005: If the CPU1 is not online, the user is prompted that, to dynamically remove the CPU0, and it needs to dynamically remove the IOH; if the user chooses to dynamically remove the IOH, the IOH is used as a current basic device unit, and step S1006 is performed. Or, the user is prompted to dynamically add the CPU1 first, and then to dynamically remove the CPU0, so that the use of the IOH is not affected. If the CPU1 is not online, after the CPU0 is dynamically removed, the IOH cannot work normally, and the dynamic removal condition of the CPU0 is not satisfied.

S1006: Obtain a dynamic removal dependency relationship list of the current basic device unit.

The dynamic removal dependency relationship list of the IOH used as the current basic device unit in this case is obtained.

If the dynamic removal dependency relationship list of the current basic device unit is null, the user is prompted to dynamically remove the current basic device unit. That is, dynamic removal processing is performed on the current basic device unit, and after the dynamic removal processing is performed on the current basic device unit, the user is prompted to dynamically remove the target device CPU0.

S1007: Whether the dynamic removal dependency relationship list is null. If no, step S1008 is performed; if yes, step S1010 is performed. That is, the user is prompted to first dynamically remove one or more corresponding basic device units such as the IOH, and then to dynamically remove the CPU0.

S1008: If the dynamic removal dependency relationship list is not null, obtain a dynamic addition dependency relationship list of each lower level basic device unit in the dynamic removal dependency relationship list of the current basic device unit.

S1009: It is judged whether a state of a basic device unit in the dynamic addition dependency relationship list of each lower level basic device unit satisfies the dynamic removal condition of the current basic device unit.

If the state of the basic device unit in the dynamic addition dependency relationship list of each lower level basic device unit satisfies the dynamic removal condition of the current basic device unit, step S1010 is performed. The user is prompted to dynamically remove the current basic device unit, so that dynamic removal processing is performed on the current basic device unit, and after the dynamic removal processing is performed on the current basic device unit, the user is prompted to dynamically remove the target device.

If the state of the basic device unit in the dynamic addition dependency relationship list of each lower level basic device unit does not satisfy the dynamic removal condition of the current basic device unit, a lower level basic device unit, which results in that the dynamic removal condition of the current basic device unit is not satisfied, is determined as a current basic device unit, and the step S1006 is performed until dynamic removal processing is performed on all current basic device units.

S1010: Prompt the user to dynamically remove a corresponding device.

Implementation of the embodiments of the present invention has the following beneficial effects:

When the target device is dynamically removed, dynamic removal analysis and processing is performed in combination with a dynamic removal dependency relationship list and dynamic addition dependency relationship list of the target device to be dynamically removed. When the target device is dynamically removed, the present invention can ensure that only the target device and some devices that have to be dynamically removed are dynamically removed, thereby maximally ensuring that work of other devices of a server is not affected, and more intelligently implementing device dynamic removal processing. Additionally, the present invention can further judge, according to the dynamic addition dependency relationship list, whether circular dependency exists, and stop performing dynamic removal processing on a device during occurrence of circular dependency, thereby avoiding occurrence of an infinite loop, and further ensuring dynamic removal of a device and normal work of a server.

Persons skilled in the art should understand that all or a part of the processes of the method according to the embodiments of the present invention may be implemented by a program instructing relevant hardware. The program may be stored in a computer readable storage medium. When the program is run, the processes of the method according to the embodiments of the present invention are performed. The storage medium may be a magnetic disk, an optical disk, a read-only memory (Read-Only Memory, ROM) or a random access memory (Random Access Memory, RAM).

The foregoing description is merely an exemplary embodiment of the present invention, but not intended to limit the scope of the present invention. Any modification, equivalent replacement, or improvement made according to the appended claims of the present invention should fall within the protection scope of the present invention.

What is claimed is:

1. A method for device dynamic addition processing, comprising:
    obtaining a dynamic addition dependency relationship list of a target device to be dynamically added, wherein the dynamic addition dependency relationship list records a basic device unit which the target device is dependent on when working in a normal status; and
    performing dynamic addition processing on the target device according to a state of the basic device unit in the dynamic addition dependency relationship list, wherein the step of performing the dynamic addition processing on the target device according to the state of the basic device unit in the dynamic addition dependency relationship list comprises:
        judging whether the state of the basic device unit in the dynamic addition dependency relationship list satisfies a dynamic addition condition of the target device;
        when the state of the basic device unit in the dynamic addition dependency relationship list satisfies the dynamic addition condition of the target device, prompting a user to dynamically add the target device; and
        when the state of the basic device unit in the dynamic addition dependency relationship list does not satisfy the dynamic addition condition of the target device, determining a first basic device unit, which results in the target device not satisfying the dynamic addition condition, in the dynamic addition dependency relationship list as a current basic device unit, performing the dynamic addition processing on the current basic device unit, and prompting the user to dynamically add the target device after the dynamic addition processing is performed on the current basic device unit.

2. The method according to claim 1, wherein the performing dynamic addition processing on the current basic device unit according to the state of the basic device unit in the dynamic addition dependency relationship list comprises:

obtaining a dynamic addition dependency relationship list of the current basic device unit, wherein the dynamic addition dependency relationship list of the current basic device unit records an upper level basic device unit on which the current basic device unit is in dependence;

judging whether a state of the upper level basic device unit in the dynamic addition dependency relationship list of the current basic device unit satisfies a dynamic addition condition of the current basic device unit;

if the state of the upper level basic device unit in the dynamic addition dependency relationship list of the current basic device unit satisfies the dynamic addition condition of the current basic device unit, prompting the user to dynamically add the current basic device unit, so that the dynamic addition processing is performed on the current basic device unit; and if the state of the upper level basic device unit in the dynamic addition dependency relationship list of the current basic device unit does not satisfy the dynamic addition condition of the current basic device unit, determining an upper level basic device unit, which results in the dynamic addition condition of the current basic device unit not being satisfied, as a current basic device unit, and performing the dynamic addition processing on the current basic device unit determined in this step, until the dynamic addition processing is performed on all current basic device units.

3. The method according to claim 2, wherein the performing dynamic addition processing on the target device according to the state of the basic device unit in the dynamic addition dependency relationship list further comprises:

judging whether a circular dependency relationship between the target device and other devices exists, and stopping performing the dynamic addition processing if the circular dependency relationship exists.

4. The method according to claim 2, wherein the obtaining the dynamic addition dependency relationship list of the target device to be dynamically added comprises:

inputting a parameter for obtaining a dynamic addition dependency relationship of the target device, through a platform-unrelated interface connected to a basic input output system (BIOS), so that the BIOS parses the dynamic addition dependency relationship of the target device, and after the dynamic addition dependency relationship of the target device is parsed, the BIOS returns the dynamic addition dependency relationship list of the target device through the platform-unrelated interface.

5. A method for device dynamic removal processing, comprising:

obtaining a dynamic removal dependency relationship list of a target device to be dynamically removed, wherein the dynamic removal dependency relationship list records several basic device units which are dependent on the target device when working;

if the dynamic removal dependency relationship list is null, prompting a user to dynamically remove the target device;

if the dynamic removal dependency relationship list is not null, obtaining a dynamic addition dependency relationship list of each of the several basic device units in the dynamic removal dependency relationship list, wherein the dynamic addition dependency relationship list records a basic device unit which each of the several basic device units is dependent on when working in a normal status; and performing the dynamic removal processing on the target device according to a state of the basic device unit in the obtained dynamic addition dependency relationship list.

6. The method according to claim 5, wherein the performing dynamic removal processing on the target device according to the state of the basic device unit in the obtained dynamic addition dependency relationship list comprises:

judging whether a state of a basic device unit in each dynamic addition dependency relationship list satisfies a dynamic removal condition of the target device;

if the state of the basic device unit in each dynamic addition dependency relationship list satisfies the dynamic removal condition of the target device, prompting the user to dynamically remove the target device; and if the state of the basic device unit in each dynamic addition dependency relationship list does not satisfy the dynamic removal condition of the target device, determining a second basic device unit in the dynamic removal dependence list as a current basic device unit, wherein the second basic device unit results in the dynamic removal condition of the target device not being satisfied, performing the dynamic removal processing on the current basic device unit determined in this step, and after the dynamic removal processing is performed on the current basic device unit determined in this step, prompting the user to dynamically remove the target device.

7. The method according to claim 6, wherein the performing dynamic removal processing on the current basic device unit comprises:

obtaining a dynamic removal dependency relationship list of the current basic device unit, wherein the dynamic removal dependency relationship list of the current basic device unit records a lower level basic device unit in dependence on the current basic device unit;

if the dynamic removal dependency relationship list of the current basic device unit is null, prompting the user to dynamically remove the current basic device unit, so that the dynamic removal processing is performed on the current basic device unit, and after the dynamic removal processing is performed on the current basic device unit, prompting the user to dynamically remove the target device; and if the dynamic removal dependency relationship list is not null, obtaining a dynamic addition dependency relationship list of each lower level basic device unit in the dynamic removal dependency relationship list of the current basic device unit, judging whether a state of a basic device unit in the dynamic addition dependency relationship list of each lower level basic device unit satisfies a dynamic removal condition of the current basic device unit, if the state of the basic device unit in the dynamic addition dependency relationship list of each lower level basic device unit satisfies the dynamic removal condition of the current basic device unit, prompting the user to dynamically remove the current basic device unit, so that the dynamic removal processing is performed on the current basic device unit, and after the dynamic removal processing is performed on the current basic device unit, prompting the user to dynamically remove the target device, if the state of the basic device unit in the dynamic addition dependency relationship list of each lower level basic device unit does not satisfy the dynamic removal condition of the current basic device unit, determining a lower level basic device unit, which results in the dynamic removal condition of the current basic device unit not being satisfied, as a current basic device unit, and performing the dynamic removal processing on the current basic device unit determined in this step, until the dynamic removal processing is performed on all current basic device units.

8. The method according to claim 7, wherein the performing dynamic removal processing on the target device according to the state of the basic device unit in the dynamic addition dependency relationship list further comprises:

judging whether a circular dependency relationship between the target device and other devices exists, and stopping performing the dynamic addition processing if the circular dependency relationship between the target device and the other devices exists.

9. An apparatus for device dynamic addition processing, comprising:

a dependency relationship obtaining module, configured to obtain a dynamic addition dependency relationship list of a target device to be dynamically added, wherein the dynamic addition dependency relationship list records several basic device units which the target device is dependent on when working in a normal status; and a processing module, configured to:

perform the dynamic addition processing on the target device according to a state of a basic device unit in the dynamic addition dependency relationship list obtained by the dependency relationship obtaining module, wherein the processing module is specifically configured to:

judge whether a state of the basic device unit in the dynamic addition pendency relationship list satisfies a dynamic addition condition of the target device, prompt the user to dynamically add the target device when the state of the basic device unit in the dynamic addition dependency relationship list satisfies a dynamic addition condition of the target device, and determine a first basic device unit which results in the target device not satisfying in the dynamic addition condition, in the dynamic addition dependency relationship list as a current basic device unit, and instruct the dependency relationship obtaining module to obtain a dynamic addition dependency relationship list of the current basic device unit, perform dynamic addition processing on the current basic device unit according to the dynamic addition dependency relationship list of the current basic device unit, and after dynamic addiction processing is performed on the current basic device unit, prompt the user to dynamically add the target device, when the state of the basic device unit in the dynamic addition dependency relationship list does not satisfy the dynamic addition condition of the target device.

10. The apparatus according to claim 9, further comprising:

a judging module, configured to judge whether a circular dependency relationship between the target device and other devices exists in a procedure that the processing module performs the dynamic addition processing on the target device, and when the circular dependency relationship between the target device and the other devices exists, instruct the first processing module to stop performing the dynamic addition processing.

11. The apparatus according to claim 9, wherein the dependency relationship obtaining module comprises:

a parameter input unit, configured to input a parameter used for obtaining a dynamic addition dependency relationship of the target device through a platform-unrelated interface connected to a basic input output system (BIOS), so that the BIOS parses the dynamic addition dependency relationship of the target device, and after the dynamic addition dependency relationship of the target device is parsed, returns the dynamic addition dependency relationship list of the target device through the platform-unrelated interface; and an obtaining unit, configured to obtain the dynamic addition dependency relationship list of the target device returned by the BIOS.

12. An apparatus for device dynamic removal processing, comprising:

a dependency relationship obtaining module, configured to: obtain a dynamic removal dependency relationship list of a target device to be dynamically removed, wherein the dynamic removal dependency relationship list records several basic device units which are dependent on the target device when working; and a processing module, configured to: when the dynamic removal dependency relationship list is null, prompt a user to dynamically remove the target device; obtain a dynamic addition dependency relationship list of each basic device unit in the dynamic removal dependency relationship list through the dependency relationship obtaining module when the dynamic removal dependency relationship list is not null, wherein the dynamic addition dependency relationship list records a basic device unit which each basic device unit is dependent on when working in a normal status; and perform the dynamic removal processing on the target device according to a state of the basic device unit in the dynamic addition dependency relationship list.

13. The apparatus according to claim 12, further comprising:

a judging module, configured to judge whether a circular dependency relationship between the target device and other devices exists in a procedure that the second processing module performs the dynamic removal processing on the target device, and if the circular dependency relationship between the target device and the other devices exists, instruct the second processing module to stop performing the dynamic removal processing.

14. A non-transitory computer-readable medium having computer executable instructions which, when executed by a computer processor, causes the computer processor to execute the following:

obtaining a dynamic addition dependency relationship list of a target device to be dynamically added, wherein the dynamic addition dependency relationship list records a basic device unit which the target device is dependent on when working in a normal status; and performing dynamic addition processing on the target device according to a state of the basic device unit in the dynamic addition dependency relationship list;

wherein the step of performing the dynamic addition processing on the target device according to the state of the basic device unit in the dynamic addition dependency relationship list comprises:

judging whether the state of the basic device unit in the dynamic addition dependency relationship list satisfies a dynamic addition condition of the target device;

when the state of the basic device unit in the dynamic addition dependency relationship list satisfies the dynamic addition condition of the target device, prompting a user to dynamically add the target device; and when the state of the basic device unit in the dynamic addition dependency relationship list does not satisfy the dynamic addition condition of the target device, determining a first basic device unit, which results in the target device not satisfying the dynamic addition condition, in the dynamic addition dependency relationship list as a current basic device unit, performing the dynamic addition processing on the current basic device unit, and prompting the user to dynamically add the target device, after the dynamic addition processing is performed on the current basic device unit.

15. A non-transitory computer-readable medium having computer executable instructions which, when executed by a computer processor, causes the computer processor to execute the following:

obtaining a dynamic removal dependency relationship list of a target device to be dynamically removed, wherein the dynamic removal dependency relationship list records several basic device units which are dependent on the target device when working;

when the dynamic removal dependency relationship list is null, prompting a user to dynamically remove the target device;

when the dynamic removal dependency relationship list is not null, obtaining a dynamic addition dependency relationship list of each of the several basic device units in the dynamic removal dependency relationship list, wherein the dynamic addition dependency relationship list records a basic device unit which each of the several basic device units is dependent on when working in a normal status; and performing the dynamic removal processing on the target device according to a state of the basic device unit in the obtained dynamic addition dependency relationship list.

* * * * *

UNITED STATES PATENT AND TRADEMARK OFFICE
CERTIFICATE OF CORRECTION

| | | |
|---|---|---|
| PATENT NO. | : 8,595,404 B2 | Page 1 of 1 |
| APPLICATION NO. | : 13/687811 | |
| DATED | : November 26, 2013 | |
| INVENTOR(S) | : Liu et al. | |

It is certified that error appears in the above-identified patent and that said Letters Patent is hereby corrected as shown below:

Title page, Item 71 Applicant's City of Residence "Guangdong (CN)" should read

-- Shenzhen (CN) --.

Signed and Sealed this
Eighteenth Day of February, 2014

Michelle K. Lee
*Deputy Director of the United States Patent and Trademark Office*